(12) United States Patent
Loterie et al.

(10) Patent No.: US 12,485,618 B2
(45) Date of Patent: Dec. 2, 2025

(54) METHOD AND APPARATUS FOR VOLUMETRIC ADDITIVE MANUFACTURING WITH DIGITAL DISTORTION COMPENSATION

(71) Applicant: ECOLE POLYTECHNIQUE FEDERALE DE LAUSANNE (EPFL), Lausanne (CH)

(72) Inventors: Damien Loterie, Ecublens (CH); Paul Delrot, Morges (CH); Christophe Moser, Lausanne (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 337 days.

(21) Appl. No.: 17/762,834

(22) PCT Filed: Sep. 21, 2020

(86) PCT No.: PCT/EP2020/076313
§ 371 (c)(1),
(2) Date: Mar. 23, 2022

(87) PCT Pub. No.: WO2021/058437
PCT Pub. Date: Apr. 1, 2021

(65) Prior Publication Data
US 2022/0324174 A1 Oct. 13, 2022

(30) Foreign Application Priority Data

Sep. 24, 2019 (EP) .................................... 19199104

(51) Int. Cl.
| | | |
|---|---|---|
| *B29C 64/386* | (2017.01) | |
| *B29C 64/129* | (2017.01) | |
| *B29C 64/241* | (2017.01) | |
| *B33Y 10/00* | (2015.01) | |
| *B33Y 30/00* | (2015.01) | |
| *B33Y 50/00* | (2015.01) | |

(52) U.S. Cl.
CPC .......... *B29C 64/386* (2017.08); *B29C 64/129* (2017.08); *B29C 64/241* (2017.08);
(Continued)

(58) Field of Classification Search
CPC ... B29C 64/386; B29C 64/129; B29C 64/241; B29C 64/135; B29C 64/124; B29C 64/106; G01M 11/00; G05B 2219/49007
See application file for complete search history.

(56) References Cited

U.S. PATENT DOCUMENTS

| | | |
|---|---|---|
| 2016/0320771 A1 | 11/2016 | Huang |
| 2018/0326666 A1 | 11/2018 | Kelly et al. |

FOREIGN PATENT DOCUMENTS

| | | | | |
|---|---|---|---|---|
| CN | 108312518 A | * | 7/2018 | ........... B29C 64/135 |
| EP | 3 428 585 A1 | | 1/2019 | |
| WO | 2019/043529 A1 | | 3/2019 | |

OTHER PUBLICATIONS

B.E. Kelly et al., "Volumetric Additive Manufacturing via Tomographic Reconstruction", Science, vol. 363, Issue 6431, pp 1075-1079, Mar. 8, 2019, See Spc., p. 1.
(Continued)

*Primary Examiner* — Galen H Hauth
*Assistant Examiner* — Mohamed K Ahmed Ali
(74) *Attorney, Agent, or Firm* — Finch & Maloney PLLC

(57) ABSTRACT

The present invention is related to a method of digitally compensating distortions of rays of a light beam in tomography-based additive manufacturing, wherein said tomography-based additive manufacturing involves projecting light patterns from multiple angles into a container (22) comprising photoresponsive material, by simulating the path of the light rays through the container (22) and the photoresponsive material; and digitally compensating the light projections based on the simulated path of the light rays, so as to
(Continued)

obtain modified light projections. The present invention is also related to a method and apparatus for preparing an object (24) in tomography-based additive manufacturing, employing said distortion compensation method.

2 Claims, 3 Drawing Sheets

(52) U.S. Cl.
CPC .............. *B33Y 10/00* (2014.12); *B33Y 30/00* (2014.12); *B33Y 50/00* (2014.12)

(56) References Cited

OTHER PUBLICATIONS

P.N. Bernal et al., "Volumetric Bioprinting of Complex Living-Tissue Constructs within Seconds", Advanced Materials, Aug. 19, 2019, See Spc., p. 1.

A.H. Delaney et al., "A Fast and Accurate Fourier Algorithm for Iterative Parallel-Beam Tomography", IEEE Transactions on Image Processing, vol. 5, Issue 5, May 1996, pp. 740-753, See Spc., p. 7 (To Follow).

B.E. Kelly et al., "Computer Axial Lithography (CAL): Toward Single step 3D Printing of Arbitrary Geometries", May 16, 2017, See International Search.

International Search Report Corresponding to PCT/EP2020/076313 mailed Dec. 22, 2020.

Written Opinion Corresponding to PCT/EP2020/076313 mailed Dec. 22, 2020.

Alexander H. Delaney, "A Fast and Accurate Fourier Algorithm for Iterative Parallel-Beam Tomography", IEEE Transaction on Image Processing, vol. 5, No. 5, May 1996.

European Office Action Corresponding to 20774981.3 mailed Feb. 22, 2022.

Chinese Office Action Corresponding to 202080060920.6 mailed Jan. 31, 2024.

* cited by examiner

METHOD AND APPARATUS FOR VOLUMETRIC ADDITIVE MANUFACTURING WITH DIGITAL DISTORTION COMPENSATION

FIELD OF THE INVENTION

The present invention relates to methods and apparatus for the volumetric fabrication of three-dimensional objects from photoresponsive materials. In particular, the present invention is related, but not restricted, to manufacturing systems wherein the optical distortion induced by the cylindrical wall of the container is compensated.

BACKGROUND

In tomography-based additive manufacturing methods, a volume of photoresponsive material (resin) comprised within a container, typically a cylindrical container, is irradiated from multiple angles with computed patterns of light in order to fabricate a three-dimensional object. The main advantage of this method is its very rapid manufacturing time (down to a few tens of seconds) compared to existing methods. For a detailed explanation of this method, reference is made to the publications in the next paragraph.

State-of-the-art tomographic printers usually include a bath of index-matching liquid surrounding the resin container (see e.g. US 2018/0326666 A1; "Volumetric additive manufacturing via tomographic reconstruction", B. E. Kelly, I. Bhattacharya, H. Heidari, M. Shusteff, C. M. Spadaccini, and H. K. Taylor; Science Vol. 363, Issue 6431, pp. 1075-1079 (8 Mar. 2019); "Volumetric Bioprinting of Complex Living-Tissue Constructs within Seconds," P. N. Bernal, P. Delrot, D. Loterie, Y. Li, J. Malda, C. Moser, and R. Levato, Advanced Materials, 19 Aug. 2019). The bath of index-matching liquid minimizes the lensing effect caused by the cylindrical shape of the container of photoresponsive material (e.g. US 2018/0326666 A1). Mitigating lensing effects is necessary in order to use standard tomography algorithms for the calculation of the light patterns, such as the Radon transform.

However, using a bath of index-matching liquid is undesirable for multiple reasons. First, it is not always possible to find an index-matching liquid exactly matching the properties of the resin while simultaneously being safe to handle and convenient to clean up in case of spills.

Instead of using a bath of index-matching liquid, it is also possible to use a compensating lens as disclosed before (see WO 2019/043529 A1). This solution avoids the use of an index-matching liquid, but the lens needs to be adapted to the optical properties of the container. For example, each time a different size or material is used for the container, the compensating lens should be replaced, too.

Consequently, there is a need for a method of tomographic additive manufacturing that can easily be adapted to different resins and containers without changes to the printing apparatus.

SUMMARY OF THE INVENTION

The present invention is related to a method of digitally compensating distortions of rays of a light beam in tomography-based additive manufacturing, wherein said tomography-based additive manufacturing involves projecting light patterns from multiple angles into a container comprising photoresponsive material, said method comprising the steps of:

simulating the path of the light rays through the container and the photoresponsive material;

digitally compensating the light projections based on the simulated path of the light rays, so as to obtain modified light projections.

The present invention is furthermore related to a method of preparing an object in tomography-based additive manufacturing, wherein said tomography-based additive manufacturing involves projecting light patterns from multiple angles into a container comprising photoresponsive material, said method comprising the steps of:

providing said container comprising photoresponsive material;

carrying out a method of distortion compensation as defined above, so as to obtain modified light projections;

projecting said modified light projections into the container comprising photoresponsive material, thereby creating the object without distortions.

The present invention is furthermore related to an apparatus for digitally compensating distortions of rays of a light beam and of preparing an object in tomography-based additive manufacturing, the apparatus comprising:

a resin container for providing a resin to be polymerized, wherein said resin container is rotatable;

a unit for providing a light beam to be projected into the resin container;

a processing unit for performing a distortion compensation method, preferably as defined above, wherein said apparatus does not comprise a physical compensation component between the unit for providing said light beam and said container, such as a bath with index-matching liquid around said container or a lens.

BRIEF DESCRIPTION OF THE DRAWINGS

The invention will be better understood through the detailed description of non-limiting preferred embodiments and in reference to non-limiting drawings, wherein.

DETAILED DESCRIPTION

In tomographic volumetric additive manufacturing, a volume of photoresponsive material is illuminated from many directions with patterns of light. These patterns of light are computed with an algorithm similar to that used in X-ray computed tomography, also known as medical CT scanners.

These algorithms are known to the skilled person. An apparatus for tomographic additive manufacturing is described in detail in e.g. WO 2019/043529 A1 or US 2018/0326666 A1.

Figure 1A:
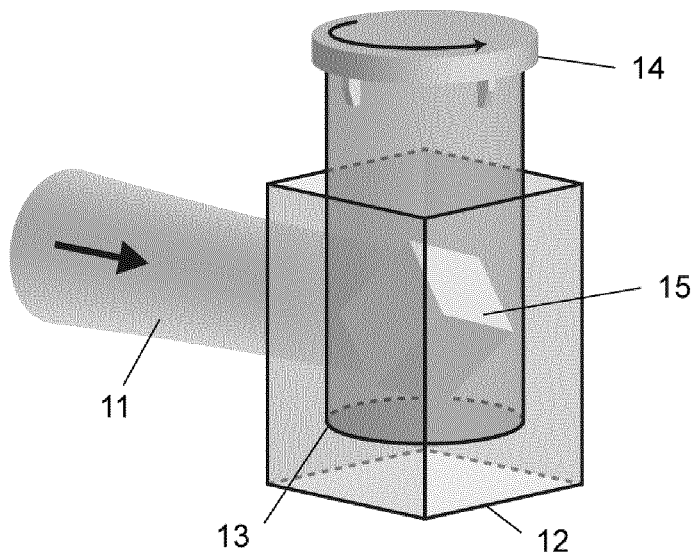
FIG. 1A is a perspective view of an embodiment of a volumetric additive manufacturing apparatus with a resin bath and an index-matching liquid bath according to the prior art.
Figure 1B:
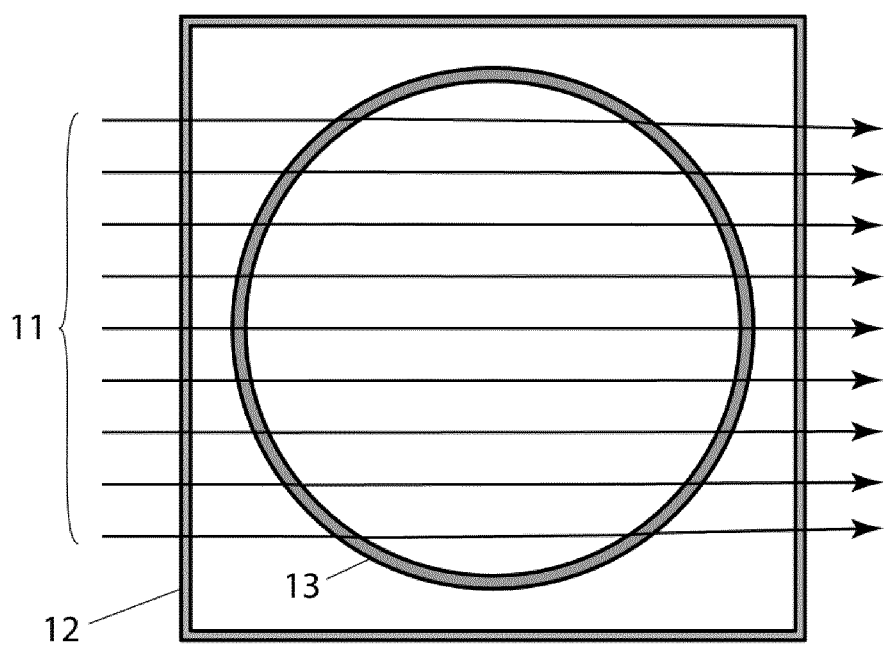
FIG. 1B is a top view of the apparatus of FIG. 1A, where rays have been traced to illustrate the path of light projections in this embodiment.

Up to now, all tomography-based volumetric additive manufacturing systems have used a physical compensation method for the distortion caused by the cylindrical shape of the container of photoresponsive material, for example a bath of index-matching liquid (as illustrated in FIG. 1A, and as described in e.g. US 2018/0326666 A1) or a compensation lens. These compensating elements mitigate the lensing effect caused by the cylindrical shape of the container of photoresponsive material, and allow light rays to travel straight through the photoresponsive material (as illustrated in FIG. 1B). Straight rays are needed to use the standard parallel-beam tomography algorithms for the calculation of light patterns (e.g. the Radon transform and its inverse).

This configuration is illustrated in FIG. 1A, where a light beam 11 first enters an index-matching liquid bath 12 and then the container 13 with photoresponsive material. The container 13 is fixed to a rotation mount (platform) 14 in order to irradiate the photoresponsive material with the light patterns 11 from various angles, thereby fabricating the object 15.

As shown in the top-view section in FIG. 1B, the light beam 11 (here represented as individual rays) passes with a negligible distortion through the index-matching bath 12 and resin container 13 in this configuration. The ray trajectories simulated in FIG. 1B assume a resin and index-matching liquid with refractive index 1.53, and fused silica containers with refractive index 1.47.

Unfortunately, compensating elements such as an index-matching liquid bath or compensation lenses must be matched to the geometry and materials used for each particular container of photoresponsive material. This means that physical changes are needed to be made to the printing apparatus when the container, or the photoresponsive material, or both of them change. Additionally, index-matching liquids can be cumbersome to handle and compensation lenses require precise alignment.

Figure 2A:
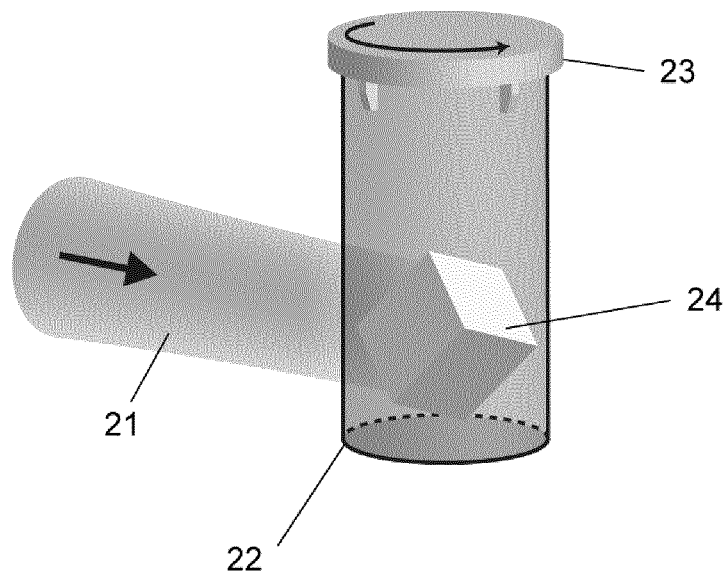
FIG. 2A is a perspective view of an embodiment of a volumetric additive manufacturing apparatus according to the present invention without compensating elements.

FIG. 2A illustrates a volumetric printing apparatus according to the present invention where no compensating elements are included. Here, the light beam 21 directly enters the container 22 of photoresponsive material. This container is attached to a rotation platform 23 as before in the apparatus shown in FIG. 1A, in order to irradiate the resin from various angles and produce the object 24.

Figure 2B:
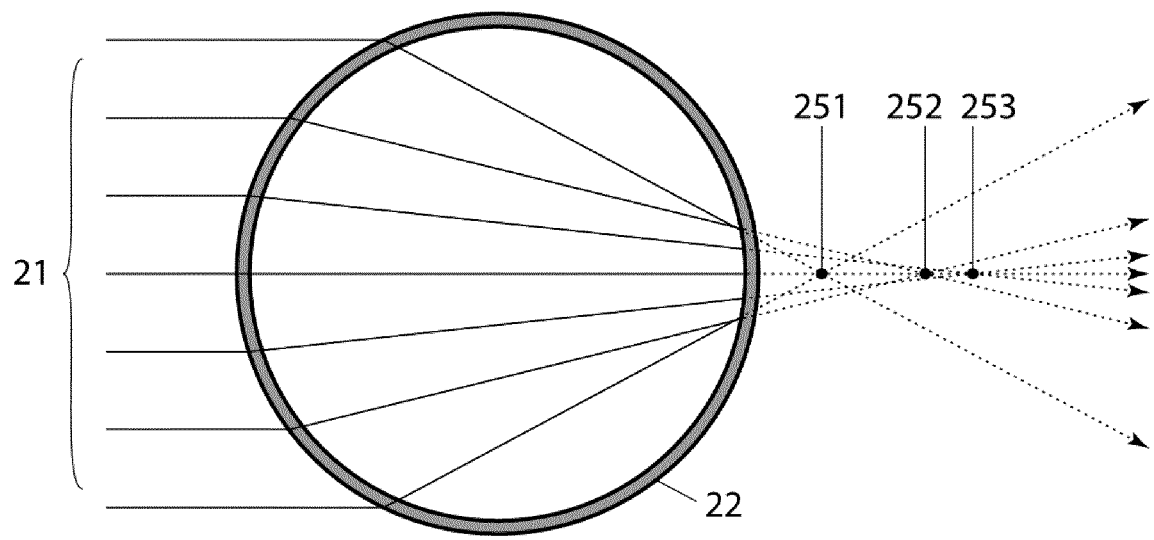
FIG. 2B is a top view of the apparatus of FIG. 2A, where rays have been traced to illustrate the path of light projections in this embodiment. The path of rays has been extended beyond the container, in order to illustrate that the rays do not all intersect in the same point.
Figure 3:
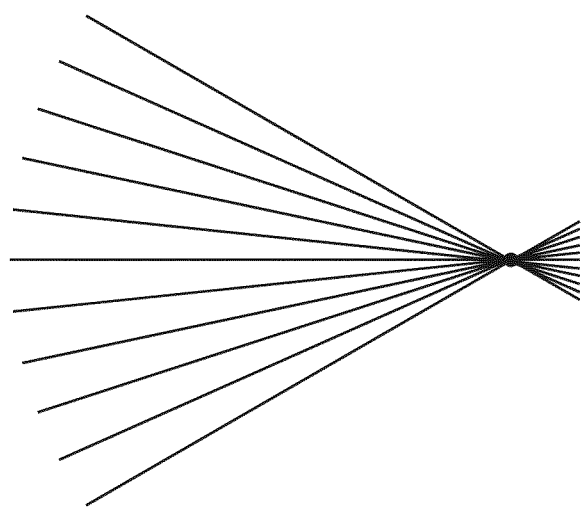
FIG. 3 is an illustration of the ray configuration required to apply the fan beam algorithm.

FIG. 2B illustrates the path of light rays through such an apparatus, using a top-view section of the apparatus of FIG. 2A. The rays of the light beam 21 now change direction as they enter the container 22 of photoresponsive medium. By virtually extending these rays outside of the container, one can observe that the rays do not all come to focus in a single point. The focus instead depends on the lateral offset of each ray before entering the container, as exemplified by the rays intersecting in points 251, 252 and 253. In summary, without using compensating elements, different light rays have different directions and the rays do not all intersect into the same point. This means that the light patterns can neither be calculated by a parallel-beam tomography algorithm (as in FIG. 1B), neither by a fan-beam tomography algorithm as this requires rays that converge into a point (as illustrated in FIG. 3), which are the algorithms typically known to the person skilled in the art.

According to the present invention, there is disclosed a method of digitally compensating distortions of rays of a light beam in tomography-based additive manufacturing, wherein said tomography-based additive manufacturing involves projecting light patterns from multiple angles into a container comprising photoresponsive material, said method comprising the steps of:
  simulating the path of the light rays through the container and the photoresponsive material.
  digitally compensating the light projections based on the simulated path of the light rays, so as to obtain modified light projections.

The digital compensation can for example be carried out by resampling:
  The light projections are calculated at every angle using a parallel-beam tomography algorithm, thereby neglecting any distortion incurred by the light beam in the actual printing apparatus.

Parallel-beam tomography algorithms are known in the art (see e.g. A. H. Delaney; Y. Bresler; A fast and accurate Fourier algorithm for iterative parallel-beam tomography, IEEE Transactions on Image Processing, Volume 5, Issue 5, May 1996, 740-753).

This yields a three-dimensional dataset containing two-dimensional light projections at several angles. This dataset can be represented mathematically as $I_{parallel}(x, y, \theta)$, where x and y represent the two spatial coordinates and $\theta$ is the angle of each projection.

Figure 2C:
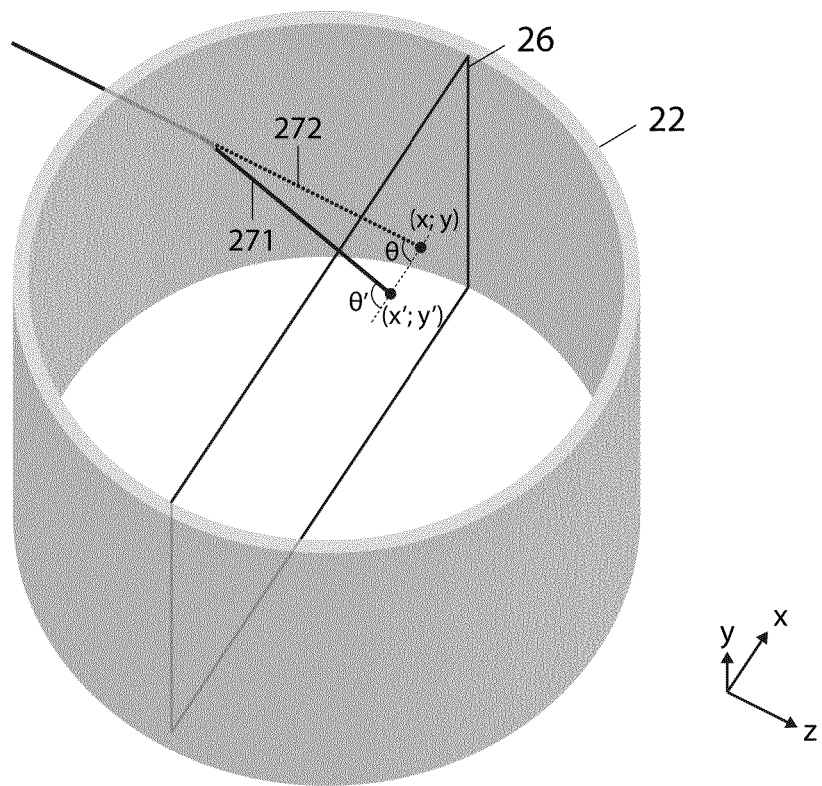
FIG. 2C is a perspective view of the apparatus of FIG. 2A, comparing the actual path of a ray versus the path expected in parallel-beam projection algorithms.

The position and orientation of the rays assumed by the parallel-beam algorithm are compared to the position and orientation of the rays obtained by simulating the light propagation through the container and photoresponsive material. This is illustrated in FIG. 2C: the path of a light ray 271 is simulated until the midplane 26 of the container 22 of photoresponsive material, and is compared to the path 272 that the ray would have taken without deviation. This yields a coordinate mapping between the ray positions and angles assumed by the parallel-beam algorithm (x, y, θ), and the simulated ray positions and angles which we describe as x', y', θ'. The coordinate mapping can be expressed mathematically as a function:

$$(x, y, \theta) \rightarrow (x', y', \theta').$$

The light projections calculated with the parallel-beam algorithm are then resampled (for example by linear interpolation) using the simulated coordinates:

$$I_{compensated} = I_{parallel}(x', y', \theta')$$

Using said distortion compensation method, it is possible to generate different objects in a tomography-based additive manufacturing method in a time- and cost efficient manner, without any need for physical modification of components of the apparatus used for performing this method.

In detail, the present invention is also related to a method of preparing an object in tomography-based additive manufacturing, wherein said tomography-based additive manufacturing involves projecting light patterns from multiple angles into a container comprising photoresponsive material, said method comprising the steps of:
  providing said container comprising photoresponsive material;
  carrying out a method of distortion compensation so as to obtain modified light projections;
  projecting said modified light projections into the container comprising photoresponsive material, thereby creating the object without distortions.

A method of preparing an object in tomography-based additive manufacturing is known from the art, e.g. from WO 2019/043529 A1 or US 2018/0326666 A1. However, the method of the present invention is characterized by the fact that the modified light projections obtained from the distortion compensation method described above are not projected through a physical compensation component, such as a bath with an index-matching liquid or a lens.

The present invention is also related to an apparatus for digitally compensating distortions of rays of a light beam and of preparing an object in tomography-based additive manufacturing, the apparatus comprising:
- a resin container for providing a resin to be polymerized, wherein said resin container is rotatable;
- a unit for providing a light beam to be projected into the resin container;
- a processing unit for performing a distortion compensation method, preferably as defined above, wherein said apparatus does not comprise a physical compensation component between the unit for providing said light beam and said container, such as a bath with index-matching liquid around said container or a lens.

An apparatus of preparing an object in tomography-based additive manufacturing is known from the art, e.g. from WO 2019/043529 A1 or US 2018/0326666 A1. However, the apparatus of the present invention is characterized by the fact that there is no physical compensation component, such as a bath with an index-matching liquid or a lens.

Since the apparatus of the present invention does not comprise a physical compensation component between the unit for providing said light beam and said container, such as a bath with index-matching liquid around said container or a lens, but rather digitally compensates any distortion of the rays of a light beam, the apparatus of the present invention does not have to be adapted to different resins and containers by changes to the printing apparatus, such as exchanging an index-matching liquid or a compensating lens.

According to a preferred embodiment, said resin container is attached to a rotation platform. By this, irradiation of the photoresponsive material with projected light patterns from multiple angles is carried out by rotating the container comprising the photoresponsive material relatively to the unit for providing said light beam.

The invention claimed is:

1. A method of digitally compensating distortions of rays of a light beam in tomography-based additive manufacturing, wherein said tomography-based additive manufacturing involves projecting light patterns from multiple angles into a container comprising photoresponsive material, said method comprising the steps of:
- digitally computing light patterns with an algorithm used in X-ray computed tomography, and providing light rays from said light patterns;
- providing the container comprising the photoresponsive material;
- digitally simulating a path of light rays constituting light projections through the container and the photoresponsive material which the light rays would take when being projected into the container in the absence of a physical compensation component between the unit for providing said light rays and said container, said light rays thus being distorted;
- digitally calculating the light projections at every angle using a parallel-beam tomography algorithm neglecting any distortion, thereby obtaining a three-dimensional dataset containing two-dimensional light projections at several angles;
- digitally comparing the position and orientation of the obtained three-dimensional dataset to the position and orientation of the rays obtained by simulating the path of light rays through the container and photoresponsive material, thereby obtaining a coordinate mapping; and
- digitally compensating light projections by resampling said light projections calculated with the parallel-beam algorithm with a resampling algorithm using said coordinate mapping, so as to obtain modified light projections that are compensated for the distortions of the simulated path of light rays.

2. The method of claim 1, wherein said resampling is made by linear interpolation.

* * * * *